(12) United States Patent
Takeuchi (10) Patent No.: US 7,708,921 B2
(45) Date of Patent: May 4, 2010

(54) SOLUTION FILM-FORMING METHOD

(75) Inventor: Takashi Takeuchi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 1568 days.

(21) Appl. No.: 10/942,983

(22) Filed: Sep. 17, 2004

(65) Prior Publication Data

US 2005/0073072 A1  Apr. 7, 2005

(30) Foreign Application Priority Data

Sep. 19, 2003  (JP) .............................. 2003-328822

(51) Int. Cl.
*B29D 7/00* (2006.01)
(52) U.S. Cl. ...................................... 264/212; 264/298
(58) Field of Classification Search ................. 264/216, 264/212, 175, 298, 22
See application file for complete search history.

(56) References Cited

U.S. PATENT DOCUMENTS 6,211,358 B1 * 4/2001 Honda et al. ................... 536/64
6,731,357 B1 * 5/2004 Tachibana et al. .............. 349/96
7,226,556 B2 * 6/2007 Yamazaki et al. ............ 264/212
7,399,440 B2 * 7/2008 Kazama et al. ............. 264/217
2004/0212112 A1 * 10/2004 Tsujimoto ................... 264/1.34
2005/0023720 A1 * 2/2005 Takeuchi ..................... 264/216

FOREIGN PATENT DOCUMENTS

| JP | 61-110520 | * | 5/1986 |
| JP | 11-90942 A | | 4/1999 |
| JP | 2003-33933 A | | 2/2003 |

* cited by examiner

*Primary Examiner*—Carlos Lopez
*Assistant Examiner*—Russell J Kemmerle, III
(74) *Attorney, Agent, or Firm*—Sughrue Mion, PLLC (57) ABSTRACT

A cast web formed on a support in a casting process is peeled off the support by a first roller in a peeling and conveying process. As being peeled by the first roller, the cast web forms a film, and conveyed through a second roller to a tenter drying process. The peeling and conveying process has a length from a peeling position to a holding position of the film by clips. The length is set to be 10% to 80% of the width of the cast web. The first and second rollers are concave rollers. A couple of blowers are disposed at the end of the peeling and conveying process, to blow the lateral sides of the film in laterally outward directions of the film, to stretch curls in the lateral sides of the film.

3 Claims, 7 Drawing Sheets

| | NUMBER OF ROLLERS | DISTANCE G (mm) | ROLLER SHAPE, ROLLER SURFACE, & CONDITION | Vr/Vf ×100 (%) | L (mm) | BLOWER | EVALUATION | | |
|---|---|---|---|---|---|---|---|---|---|
| | | | | | | | WRINKLE | FOLD | STABILITY OF HOLDING |
| COMPARATIVE | 4 | 20 | STRAIGHT HC r FLAT | 1st:102  4th:108<br>2nd:104  TENTER<br>3rd:106  :111 | 1400 | NO | C | C | C |
| EXAMPLE 1 | 4 | 5 | STRAIGHT HC r FLAT | 1st:102  4th:108<br>2nd:104  TENTER<br>3rd:106  :111 | 1200 | NO | C | B | C |
| EXAMPLE 2 | 4 | 5 | CONCAVE HC r MAT | 1st:102  4th:108<br>2nd:104  TENTER<br>3rd:106  :111 | 1200 | NO | B | B | C |
| EXAMPLE 3 | 2 | 5 | CONCAVE HC r MAT | 1st:102  TENTER<br>2nd:104  :107 | 1200 | NO | A | B | C |
| EXAMPLE 4 | 2 | 5 | CONCAVE HC r MAT | 1st:102  TENTER<br>2nd:104  :107 | 1050 | NO | A | A | B |
| EXAMPLE 5 | 2 | 5 | CONCAVE HC r MAT | 1st:102  TENTER<br>2nd:104  :107 | 1050 | YES | A | A | A |
| EXAMPLE 6 | 2 | 8 | STEPPED CERAMIC FLAT | 1st:101  TENTER<br>2nd:103  :105 | 1050 | YES | A | A | A |

SOLUTION FILM-FORMING METHOD

FIELD OF THE INVENTION

The present invention relates to a polymer film for use in optical devices such as a polarizing plate and a display device. The present invention relates also to a solution film-forming method for forming these polymer films.

BACKGROUND ARTS

The solution film-forming method can produce superior films to those produced by the melt extrusion method with respect to optical properties as well as uniformity of the film thickness. Also because fine filtering is available, the film produced by solution film-forming method contains less extraneous materials. For these reasons, the solution film-forming method is widely adopted for manufacturing many kinds of films that are applied to optical devices, such as films for liquid crystal displays (LCD), films for organic electroluminescence (EL) displays, films for polarizing plates and films for photosensitive materials.

According to this method, a polymer material is dissolved with a solvent to produce a dope, and the dope is cast from a die onto a support to form a cast web, wherein the support is a metallic band or drum. The cast web is peeled off the support afterwards, and conveyed to a tenter drying process. In the tenter drying process, opposite lateral sides of the cast web are held by holding members, such as clips, to dry the web while stretching it. In this way, a film is produced.

However, there has been a problem that the cast web can wrinkle or curl as it is peeled off the support. If the cast web curls, it can be folded or interfere with the holders as it is held at its lateral sides by the holding members. This will result in unstable holding conditions. If the cast web wrinkles, the cast web will get narrower, so the holding condition of the cast web in the tenter drying process becomes unstable. The unstable condition can cause interruption of the manufacturing process or damage the film quality.

The higher the content of the solvent in the cast web and thus the lower the rigidity of the cast web at the time of peeling, such a trouble is more likely to occur. Also where there is a large difference in the solvent content between opposite surfaces of the cast web, there is a large difference in shrinking power between the opposite surfaces, so the wrinkles and the curls get remarkable. It is also known in the art that the wider the cast web, the more the cast web is likely to get wrinkled or curled.

To solve this problem, it may be possible to set the width of the cast web narrower, or use such a low casting speed that the cast web may be peeled off after the solvent sufficiently vaporizes from the web. But these methods will lower the productivity. It may also be possible to change the components of the dope to solve the above problem. But this involves a risk of damaging optical properties of the film products in exchange for reduction of wrinkles and curls.

To solve the above problem, Japanese Laid-open Patent Application No. 2003-33933 disposes a solution film-forming method, wherein guide plates are provided at the entrance of the tenter drying process, for correcting curls on opposite lateral sides of the cast web so that the web or film can be held stably through the tenter drying process.

Japanese Laid-open Patent Application No. 11-90942 discloses a solution film-forming method wherein opposite lateral sides of the cast web are cut away after the web is peeled off, and before the web is conveyed to the tenter drying process.

Although the prior method can prevent curling at the lateral sides of the cast web, this method cannot correct the wrinkles formed in a laterally intermediate portion of the cast web.

The method of the above Japanese Laid-open Patent Application No. 11-90942 will lower the productivity because it needs cutting of the lateral sides of the cast web.

SUMMARY OF THE INVENTION

In view of the foregoing, an object of the present invention is to provide a solution film-forming method that prevents wrinkles and curls in the whole area of the cast web, without lowering the productivity.

Another object of the present invention is to provide a polymer film, a polarizing plate and a display device, which achieve high-quality at low costs.

To achieve the above and other objects, a solution film-forming method of the present invention comprises a casting process for forming a dope by dissolving a polymer with a solvent, and for casting the dope onto a moving support to form a cast web; a peeling and conveying process for peeling said cast web off said support to convey said cast web by use of conveyer rollers which rotate while being in contact with said cast web; and a tenter drying process for drying said cast web while holding opposite lateral sides of said cast web by holding members, as said cast web is conveyed from said peeling and conveying process, wherein the peeling and conveying process has a length that is 10% to 80% of a width of the cast web.

It is more preferable to set the length of the peeling and conveying process to be 20% to 70% of the width of the cast web.

The content of the solvent in the cast web in the peeling and conveying process is preferably 10% to 50% in terms of wet basis weight percent.

The number of the conveyer rollers disposed in the peeling and conveying process is preferably not more than two, and the conveyer rollers are preferably in contact with the cast web on an opposite surface from the support.

The conveyer rollers preferably satisfy the condition: $Vf \cdot 1.01 = Vr = Vf \cdot 1.1$, wherein $Vf$ is a conveying speed of any of the conveyer rollers, and $Vr$ is a moving speed of the support.

One of the conveyer rollers may be placed close to a peeling position where the cast web is peeled off the support, to serve as a peeling roller for peeling the cast web off the support.

It is preferable that the peeling roller is placed at a distance of 2 mm to 15 mm from the peeling position.

It is more preferable that the distance between the peeling position and the peeling roller is from 3 mm to 10 mm.

Each of the conveyer rollers is preferably a concave roller that has increasing diameters from its axially intermediate portion toward its opposite ends, and satisfies the condition: $D2$ $D2-(W \cdot 0.005) \leq D1 \leq D2-(W \cdot 0.0001)$, wherein $D1$ is a minimum diameter at the axially intermediate portion of the concave roller, $D2$ is a maximum diameter at the end of the concave roller, and $W$ is an axial length of the concave roller.

It is also preferable that each of the conveyer rollers is a stepped roller that has a larger diameter in its opposite end portions than a diameter in its axially intermediate portion, by an amount from 0.4 mm to 3 mm.

It is also possible to dispose blowers at the end of the peeling and conveying process and immediately before the tenter drying process, for blowing the cast web in laterally outward directions of the cast web.

The air velocity from the blower is preferably from 50 m/sec. to 150 m/sec., and the air temperature is preferably from 20° C. to 60° C.

It is preferable that the polymer is a cellulose ester, and the cast web has a thickness of 25 μm to 250 μm, a width of 1500 mm or more, and the moving speed of the support is not less than 45 m/min.

It is more preferably that the with of the cast web is from 1500 mm to 2200 mm, and the moving speed of the support is from 45 m/min. to 100 m/min.

A polymer film of the present invention is characterized by being formed according to the solution film-forming method of the invention as configured above.

The polymer film of the present invention is applicable to constitute a polarizing plate.

The polymer film of the present invention is applicable to constitute a display device.

BRIEF DESCRIPTION OF THE DRAWINGS

The above and other objects and advantages will be more apparent from the following detailed description of the preferred embodiments when read in connection with the accompanied drawings, wherein like reference numerals designate like or corresponding parts throughout the several views, and wherein.

DETAILED DESCRIPTION OF THE PREFERRED EMBODIMENTS

The present invention can use any kind of polymer as a raw material for the film, insofar as it is usable for forming a film by the solution film-forming method. But cellulose esters applicable to optoelectronics devices, such as a protective film of a polarizing plate, are preferable. And cellulose triacetate is the most preferable.

According to the present invention, the film may be manufactured from a dope or dopes using different kinds of known solvents.

In a case where cellulose triacetate is used as the polymer material for the film, a single one or a mixture of halogenated hydrocarbons such as methylene chloride, alcohols such as methanol, esters and ethers may be used as the solvent. Content of the solvent may be adjusted appropriately without any limit given to the present invention.

The dope made by dissolving the polymer in the solvent is usually filtered to eliminate extraneous elements and unsolved materials. For filtering, known filtering members, including filter paper, filter fabric, non-woven fabric, metal mesh filter, sintered metal filter, porous plates, are usable. Through the filtering, extraneous elements and unsolved materials are eliminated so as to prevent or reduce defects and damages on the product.

Solubility of the dope can be promoted by heating it. The dope may be heated while being agitated in a stationary tank, or by conducting the dope through any kind of heat exchanger, including a tubular heat exchanger and a jacket pipe with a stationary mixer. It is possible to provide a cooling process after the heating process, and pressurize the interior of the device to heat the dope up to above its boiling point. By subjecting the dope to such a heating process, fine particles of unsolved materials are solved completely or to a practically ignorable degree, so that the extraneous elements in the produced film are reduced, and also the load of filtering is reduced.

The dope used for the present invention may be added with known additives. As the additives, there are UV-absorbers, plasticizers and matting agents. But the additives are not limited to these components. As other additives that can be added to the dope, there are silica, kaolin, talc, methylene chloride, and methanol. These additives may be mixed at the time of preparation of the dope, or after the preparation of the dope, or may be inline-mixed by used of a stationary mixer while the dope is being feed.

Figure 1:
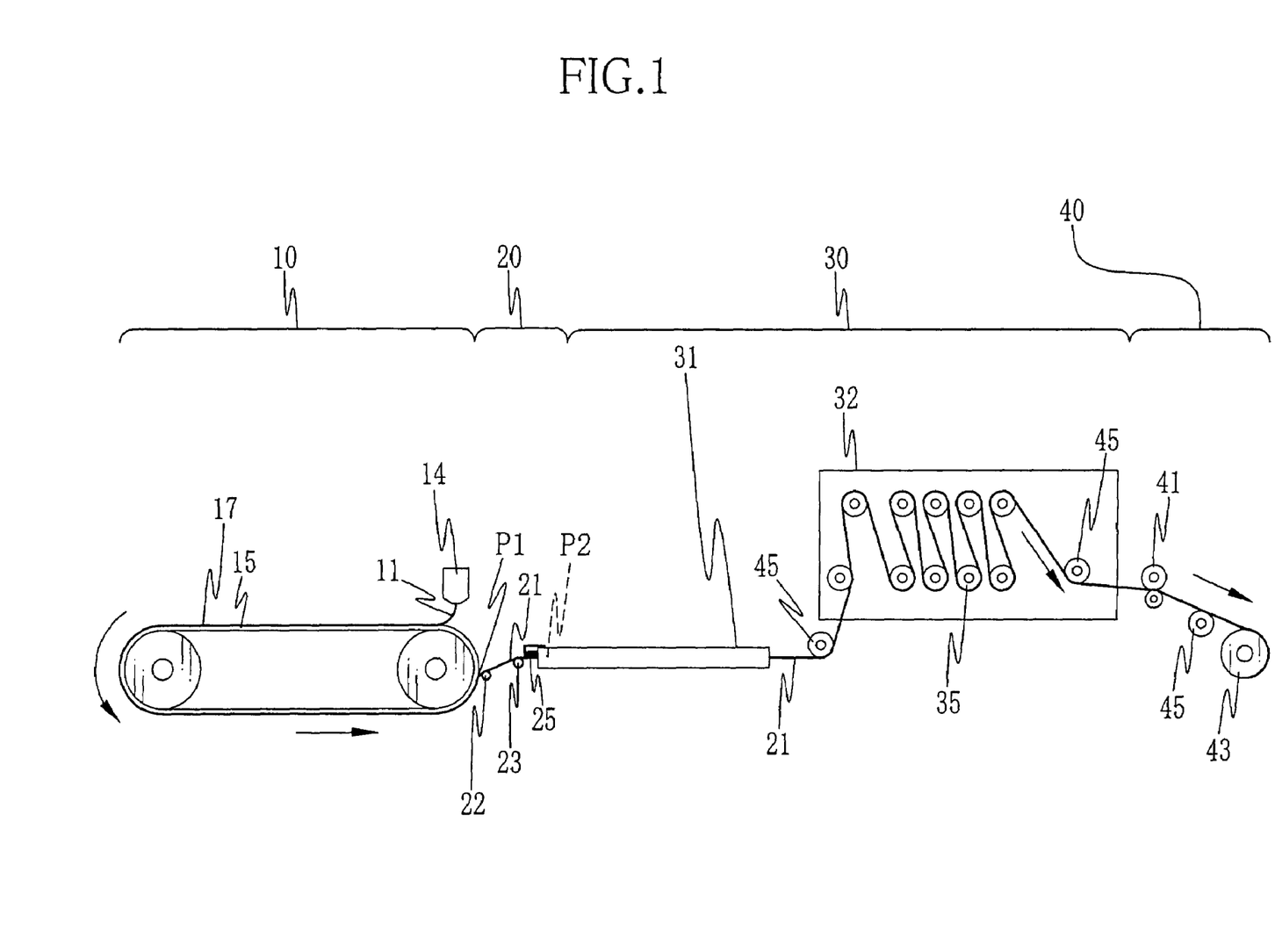
FIG. 1 is a schematic diagram illustrating a solution film-forming line embodying the method of the present invention.

FIG. 1 shows a solution film-forming line embodying the present invention, wherein the dope prepared in the above described manner is cast to form a film. The solution film-forming line is fundamentally constituted of a casting process 10, a peeling and conveying process 20, a drying process 30 and a winding process 40. The solution film-forming line may include a dope preparation process before the casting process 10, so that the dope is prepared in the line.

In the casting process 10, the dope 11 is cast from a casting die 14 onto a support 15 to form a cast web 17. In the present embodiment the support 15 is a rotary metal endless band 15.

The cast web 17 is dried on the metal band 15 as being blown with heated air from a not-shown heating air dryer. Thereby, the solvent is volatilized gradually from the cast web 17, so the cast web 17 is solidified. In the peeling and conveying process 20, the solidified cast web 17 is peeled off the metal band 15 at a peeling position P1, and is conveyed as a continuous web of film 21 to the drying process 30.

Although the present embodiment uses a single dope for casting a single-layer web, the present invention is applicable to those cases where a multi-layered film is manufactured by use of two or more kinds of dopes.

The film 21 may have appropriate thickness and width. Also the casting speed may change appropriately. But it is preferable to preset these values to satisfy the following conditions:

25 μm=Hf=250 μm, 1500 mm=Wf, 45 m/min.=Vf, wherein Hf stands for the film thickness, Wf the film width, and Vf the casting speed or moving speed of the endless band 15. More preferably, these values satisfy the following conditions: 1500 mm=Wf=2200 mm, 45 m/min.=Vf=100 m/min.

Figure 4:
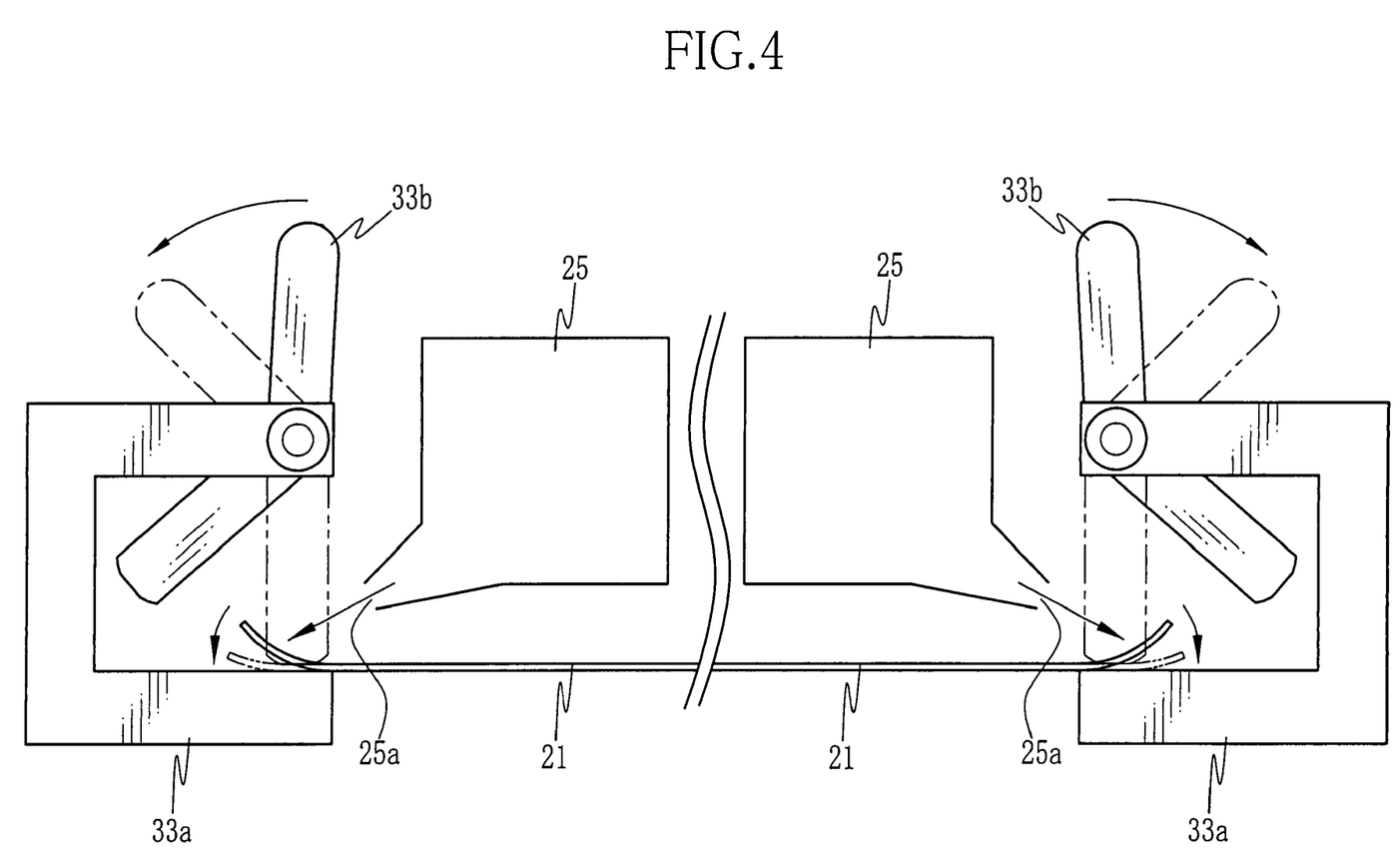
FIG. 4 is an explanatory diagram illustrating the entrance section of the tenter drying process.

The drying process 30 consists of a tenter drying process 31 and a roller drying process 32. For the tenter drying process 31, a couple of endless chains 34 are disposed on opposite lateral sides of a film path. Each endless chain 34 is provided with a number of clips 33 at regular intervals, and is driven to rotate endlessly. Each of the clips 33 consists of a clip main body 33a having a channel shape section, and a couple of holding arms 33b attached to the clip main body 33a so as to be movable relative to the main body 33a between a closed position and an open position. In the closed position, the holding arms 33b hold opposite lateral sides of the film 2, as shown in FIG. 4. As the endless chains 34 rotate, the lateral sides of the film 21 are pinched by the holding arms 33b at a holding position P2, so that the film 21 is extended in the lateral direction while being conveyed to the roller drying process 32.

Then the film 21 is dried further through the roller drying process 32 with a large number of rollers 35. After the drying process, the film 21 is preferably cooled down to a room temperature through a cooler that is not shown but attached to the roller drying process 32.

The film 21 dried sufficiently through these processes is conveyed to the winding process 40. In the winding process 40, a shearing device 41 cuts the film 21 along the lateral sides to make the film 21 have a designated width, before the film 21 is wound by the winding device 43. A number of conveyer rollers 45 for conveying the film 21 are disposed in the respective processes, though only some of them are shown in the drawings.

Now the peeling and conveying process 20 will be described in more detail with reference to FIGS. 2 and 3.

Figure 2A:
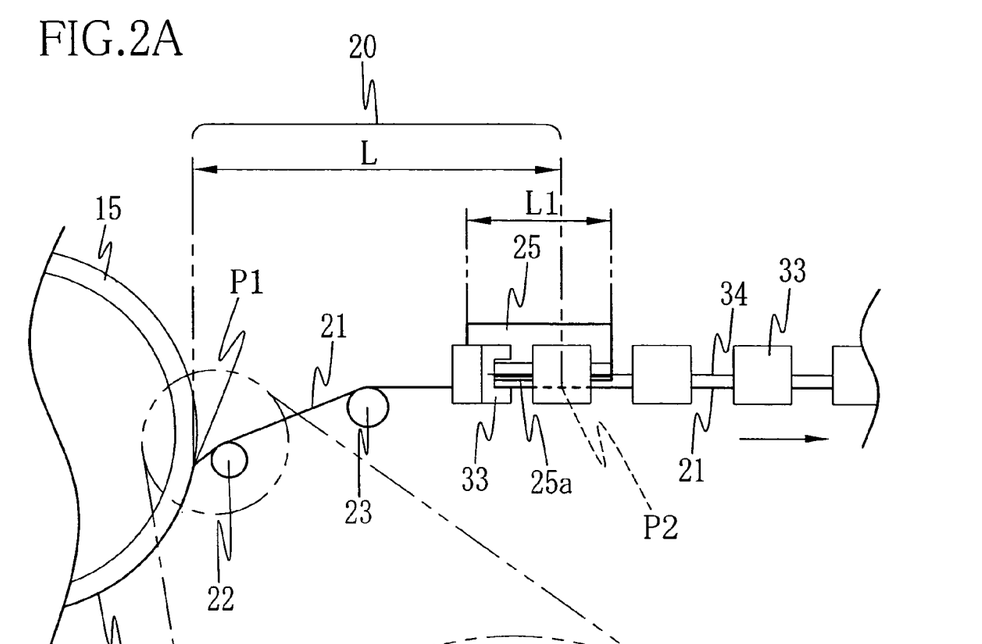
FIG. 2A is an enlarged view showing a peeling and conveying process and an entrance section of a tenter drying process in the solution film-forming line of FIG. 1.
Figure 2B:
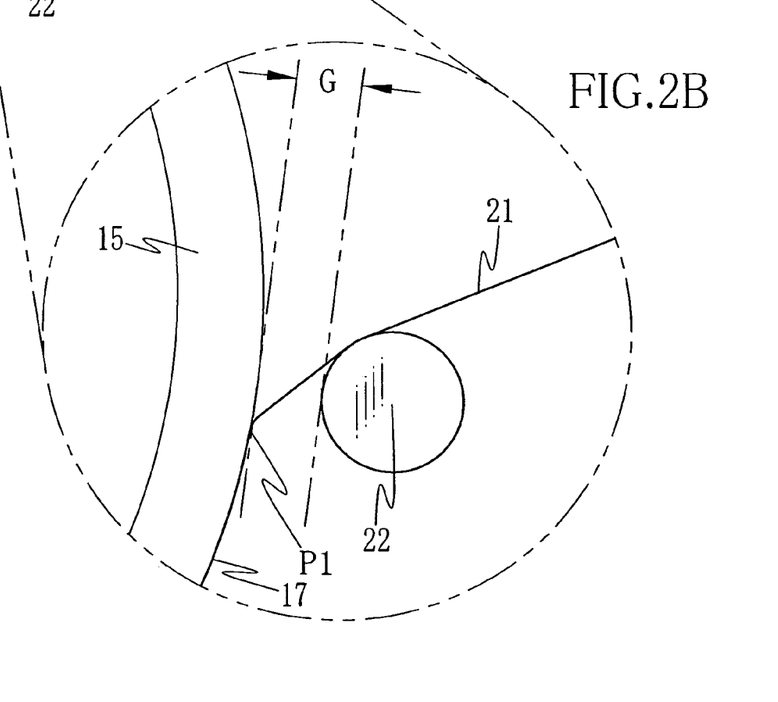
FIG. 2B is a still enlarged view showing a position where the film is peeled off a support.
Figure 3:
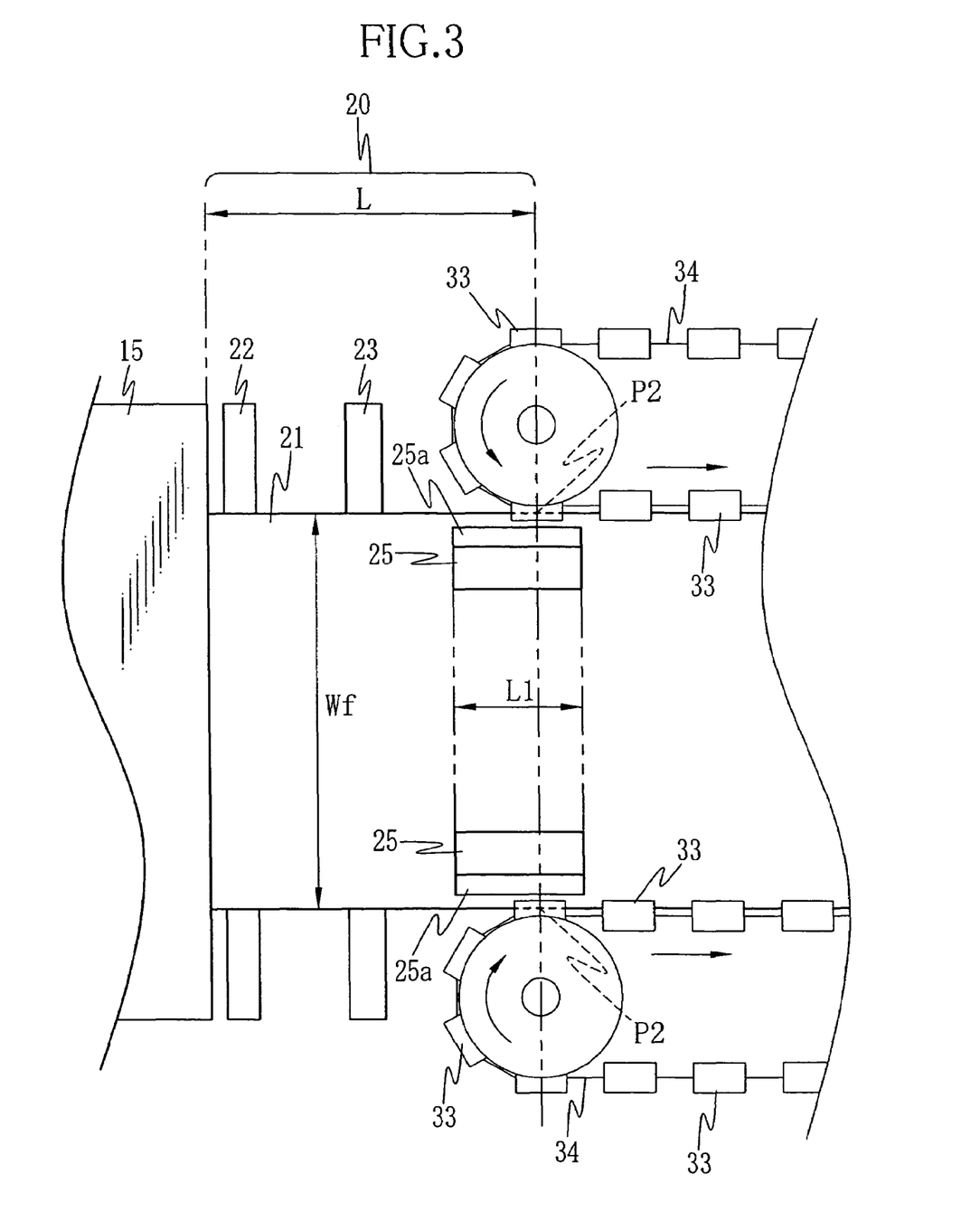
FIG. 3 is a top plan view of the peeling and conveying process and the entrance section of the tenter drying process.

As described in the brief description of the drawings, FIGS. 2 and 3 illustrate the peeling and conveying process 20 and the entrance section of the tenter drying process 31, as viewed from the lateral side of the film 21 and from above the film 21, respectively. The peeling and conveying process 20 has a length L from the peeling position P1, where the cast web 17 is peeled off the metal band 15, to the holding position P2 where the film 21 is pinched at its lateral sides by the clips 33 of the endless chains 34 at the entrance of the tenter drying process 31.

The length L of the peeling and conveying process 20 is set to be 10% to 80% of the width Wf of the cast web, and more preferably 20% to 70% of the width Wf. The content of the solvent in the film 21 in the peeling and conveying process 20 is preferably 10% to 50% in terms of wet basis weight percent.

If the length L of the peeling and conveying process 20 is too short, or the content of the solvent in the film 21 is too low, the film 21 becomes likely to snap off while being conveyed. If on the contrary the length L of the peeling and conveying process 20 is too long, or the content of the solvent in the film 21 is too large, the film becomes more likely to get wrinkled or curled.

The peeling and conveying process 20 is provided with first and second rollers 22 and 23, which are driven to rotate by a not-shown driving device. The rollers 22 and 23 come in contact with the film 21 on its opposite surface to a surface that has been in contact with the support 15. The first roller 22 is placed in the vicinity of the peeling position P1, and doubles as a conveyer roller and a peeling roller that peels the cast web 17 from the metal band 15 by its rotary movement. The second roller 23 is a conveyer roller that conveys the peeled web or film 21 to the tenter drying process 31.

The position of the first roller 22 is variable according to the need. However, if the distance between the first roller 22 and the peeling position P1 is too short, the cast web 17 can probably get jammed in the first roller 22 at the start of casting. On the other hand, if the first roller 22 is too distant from the peeling position P1, it sometimes happens that the cast web 17 is hardly peeled off in its lateral center area even while its lateral side areas are being peeled off. So it becomes impossible to peel the cast web 17 along a perpendicular line to its casting direction. As a result, the film 21 has different lengths between the central area and the lateral sides, which cause wrinkles and curls in the film 21.

For the above reasons, it is preferable to space the first roller 22 from the metal band 15 by a distance from 2 mm to 15 mm. More preferably, the distance G between the metal band 15 and the first roller 22, see FIG. 2B, is from 3 mm to 10 mm. This configuration prevents the cast web 17 from getting jammed in the first roller 22 at the start of casting, and also permits peeling the cast web 17 along an approximately perpendicular line to the casting direction.

The first roller 22 and the second roller 23 rotate such that the conveying speed of the film 21 is faster than the casting speed Vf, i.e. the moving speed of the band 15, so that the film 21 is tensed appropriately while being conveyed and peeled. The conveying speed Vf of the film 21 preferably satisfies the condition: $Vf \cdot 1.01 \leq Vr \leq Vf \cdot 1.1$.

If the tension on the conveying film 21 is too high, the film 21 can snap off. If on the contrary the tension of the film 21 is too low, the film 21 can get wrinkled or curled.

Figure 5:
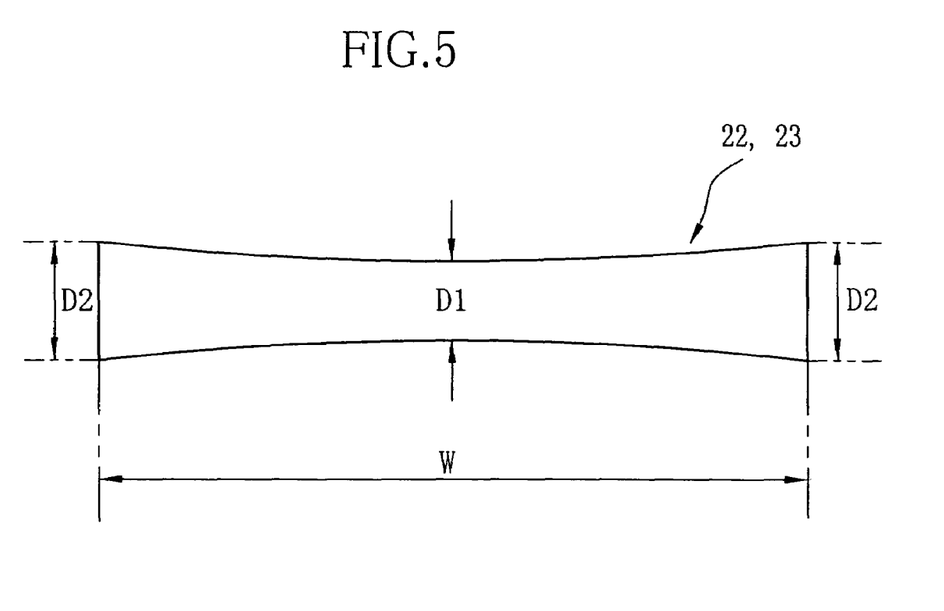
FIG. 5 is an explanatory diagram illustrating a concave roller.

As shown in FIG. 5, each of the first and second rollers 22 and 23 is a concave roller that has gradually increasing diameters from its axially intermediate portion toward opposite ends.

It is to be noted that the axial direction of each conveyer roller is equal to the lateral direction of the cast web 17 or the film 21, and that the lateral direction of the cast web 17 is a direction perpendicular to the casting direction or the conveying direction of the film 21.

The concave rollers apply forces on the conveyed film 21 in laterally outward directions of the film 21, which prevent the wrinkles and curls of the film 21 effectively. Each of the concave rollers preferably satisfies the following condition: $D2-(W \cdot 0.005) \leq D1 \leq D2-(W \cdot 0.0001)$, wherein D1 is a minimum diameter in the axially intermediate portion of the roller, D2 is a maximum diameter at the end of the roller, and W is an axial length of the roller.

If the diameter D1 is less than $D2-(W \cdot 0.005)$, the forces applied laterally outwards on the film 21 will be so strong that the film 21 is likely to deviate laterally from a proper conveying position. If the diameter D1 is more than $D2-(W \cdot 0.0001)$, the forces applied laterally outwards on the film 21 will be too weak to get the expected effect from the concave roller.

In the end of the peeling and conveying process 20, that is, immediately before the entrance of the tenter drying process 31, a couple of blowers 25 are placed above the film 21 with their air outlets 25a directed to the lateral sides of the film 21. The blowers 25 are placed insides the film 21 with respect to the lateral direction of the film 21. So the blowers 25 send the air from the air outlets 25a toward the lateral sides of the film 21 in laterally outward directions of the film 21. Thereby, the blow of air corrects or stretches the curls in the lateral sides of the film 21.

The blowers 25 blow the film 21 across a length L1 in the casting direction, as shown in FIGS. 2A and 3, wherein the length is preferably in a range from 100 mm to 500 mm. It is preferable to set the temperature of the air in a range from 20° C. to 60° C., and the velocity of the air in a range from 50 m/sec. to 150 m/sec.

If the air temperature is less than 20° C., the additives in the film 21 will be crystallized and put on some part or structural member in the tenter drying process, as they are cooled. The additives put on the parts can stain the film or may cause a secondary trouble. On the other hand, if the air temperature is above 60° C., the lateral sides of the film 21 are dried so faster than the center area of the film 21 that the curls are enhanced. Then, the lateral sides of the film 21 can be unexpectedly folded in the following processes. If the velocity of the blow is below 50 m/sec., the effect of stretching the curls is so reduced that the clips 33 cannot stably hold the film 21. If, on the other hand, the blow velocity is above 150 m/sec., the air blow can disturb the movement of the clips 33.

The peeling and conveying process of the solution film-forming line having the above described configurations operate as follows.

The cast web 17 formed on the metal band 15 in the casting process 10 is peeled off the metal band 15 by the first roller 22 in the peeling and conveying process 20. As being peeled by the first roller 22, the cast web 17 changes to the film 21, and conveyed through the second roller 23 to the tenter drying process.

Since the first roller 22 is placed close to the metal band 15, the film 21 is peeled off along a line that is approximately perpendicular to the casting direction. Therefore, the length of the film 21 in the central area does not differ from the length in the lateral sides. The first roller 22 and the second roller 23 rotate such that the conveying speed of the film 21 is faster than the casting speed Vf, so that the film 21 is tensed moderately. The first and second rollers 22 and 23 are concave rollers that apply forces laterally outwards on the film 21. These forces contribute to preventing wrinkles and curls of the film 21.

The couple of blowers 25 send blow the lateral sides of the film 21 as being conveyed through the peeling and conveying process 20. So the curls in the lateral sides of the film 21 are corrected by the blow. Because the blowers 25 are placed in the vicinity of the entrance of the tenter drying process 31, the lateral sides of the film 21, as being fed into the tenter drying process 31, are free from the curls. So the film 21 is prevented from being bent when the clips 33 are about to pinch the lateral sides of the film 21.

The length L from the peeling position P1 to the holding position P2 of the peeling and conveying process 20 is set to be 10% to 80% of the width Wf of the cast web 17. Setting the length L in this range contributes to preventing wrinkles and curls on the film 21.

Although the above embodiment uses two conveyer rollers in the peeling and conveying process, the number of conveyer rollers in the peeling and conveying process may be changed appropriately. But in order not to elongate the peeling and conveying process redundantly, it is preferable to make the number of conveyer rollers as small as possible. Although the conveyer rollers are both driven to rotate, it is possible to drive only one of these rollers. Although the conveyer rollers are both concave, it is possible to make only one of these rollers concave.

Figure 6:
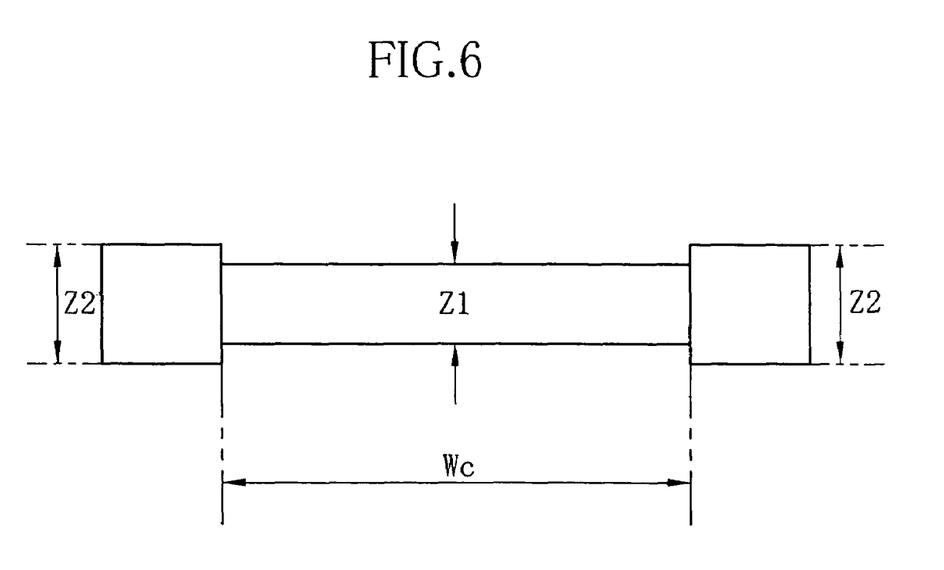
FIG. 6 is an explanatory diagram illustrating a stepped roller.

In place of the concave rollers, stepped rollers are usable as the conveyer rollers, the stepped roller having a smaller diameter Z1 in its axially intermediate portion than a diameter Z2 in opposite end portions, as shown in FIG. 6. Also the stepped rollers configured as above apply forces on the conveyed film 21 in laterally outward directions of the film 21, so the wrinkles and curls are effectively prevented.

It is preferable that the diameter Z2 of the end portions of the stepped roller is larger by 0.4 mm to 3 mm than the diameter Z1 of the intermediate portion. If the difference between these diameters Z1 and Z2 is less than 0.4 mm, the effect of suppressing the shrinking force of the film 21 toward its lateral center is too weak to prevent the film 21 from gathering or curling. If, on the contrary, the difference between the diameters Z1 and Z2 is more than 3 mm, indeed the effect of suppressing shrinkage of the film 21 increases, the film 21 will gather diagonally at the stepped portions, making the conveying condition of the film insecure.

It is preferable that the intermediate portion of the stepped roller has an axial length that is shorter than the width Wf of the film 21, by an amount from 20 mm to 100 mm.

Although the conveying speed of the first roller 22 is equal to that of the second roller 23 in the above embodiment, it is possible to make the conveying speed of the second roller higher than that of the first roller. Thereby a moderate tension is applied on the film 21 between the first roller and the second roller, so the wrinkles and curls are still more reduced. It is also possible to convey the film through the tenter drying process at a higher speed than the conveying speed of the second roller. Thereby a moderate tension is applied on the film 21 between the second roller and the tenter drying process, so the wrinkles and curls are still more reduced.

In order to prevent the surfaces of the conveyer rollers from being stained by the additives in the dope, and thus facilitate peeling the film from the roller and conveying the film effectively, it is preferable to form the surfaces of the rollers from a ceramic or hard chrome (HCr), and then process the surfaces with a mat finish or with a microporous treatment.

The diameter D1 of the opposite ends of the first and second rollers is preferably 70 mm=D1=110 mm.

Other elements of the solution film-forming line than the above described features of the present invention may be the same as described in any of the prior arts, but preferably as those disclosed in detail in Japanese Patent Application No. 2003-319673.

EXAMPLES

Hereinafter, the present invention will be described with respect to concrete Examples 1 to 6, and a Comparative, with reference to FIG. 7 and the Table shown in FIG. 8.

Figure 7:
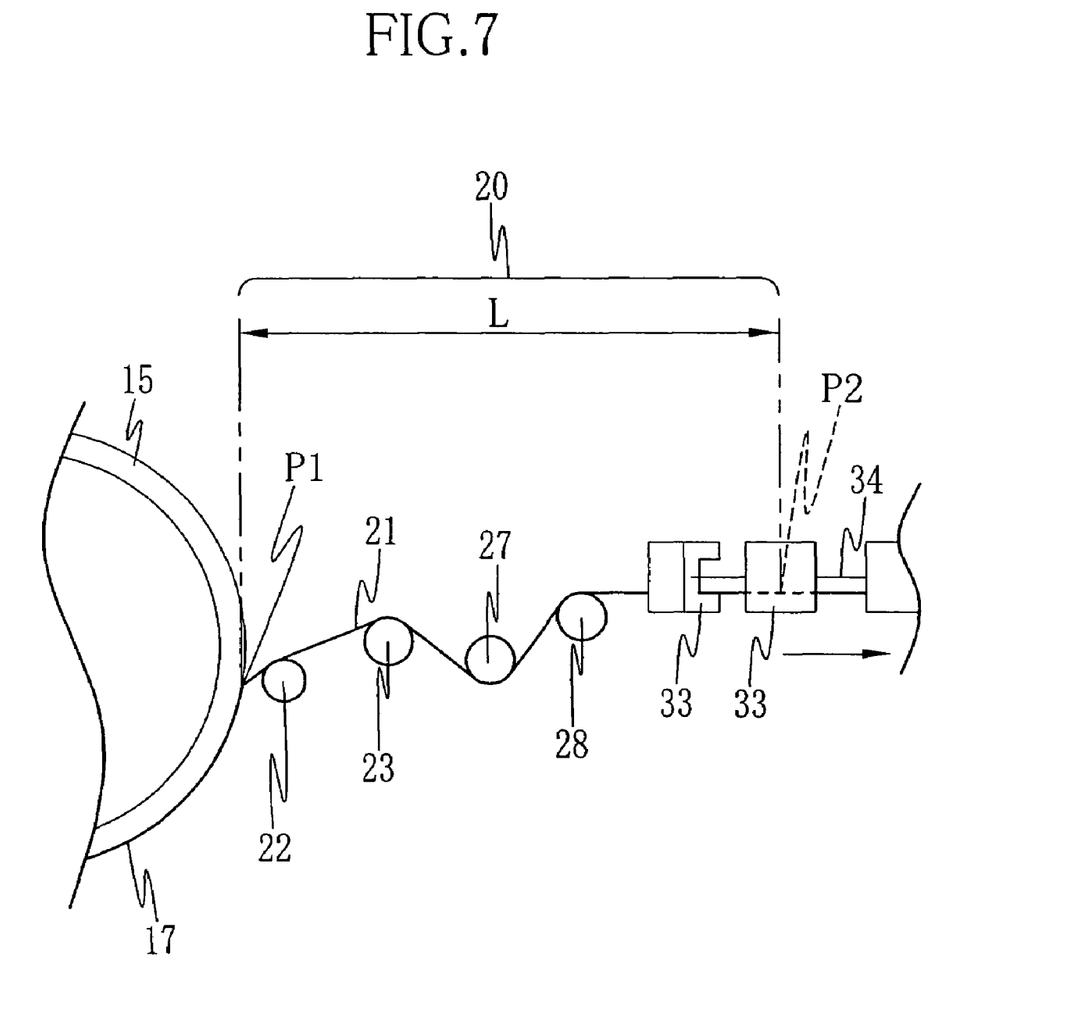
FIG. 7 is an explanatory diagram illustrating a peeling and conveying process using four conveyer rollers.

FIG. 7 shows a peeling and conveying process and an entrance of a tenter drying process of a solution film-forming line, wherein four conveyer rollers 22, 23, 27 and 28 are disposed in the peeling and conveying process, in this order from a support or endless metal band 15. The configuration of FIG. 7 is used for Comparative and Examples 1 and 2.

On the other hand, Examples 3 to 6 adopt the configuration as shown in FIG. 1, wherein the first and second rollers 22 and 23 are disposed in the peeling and conveying process.

Figure 8:
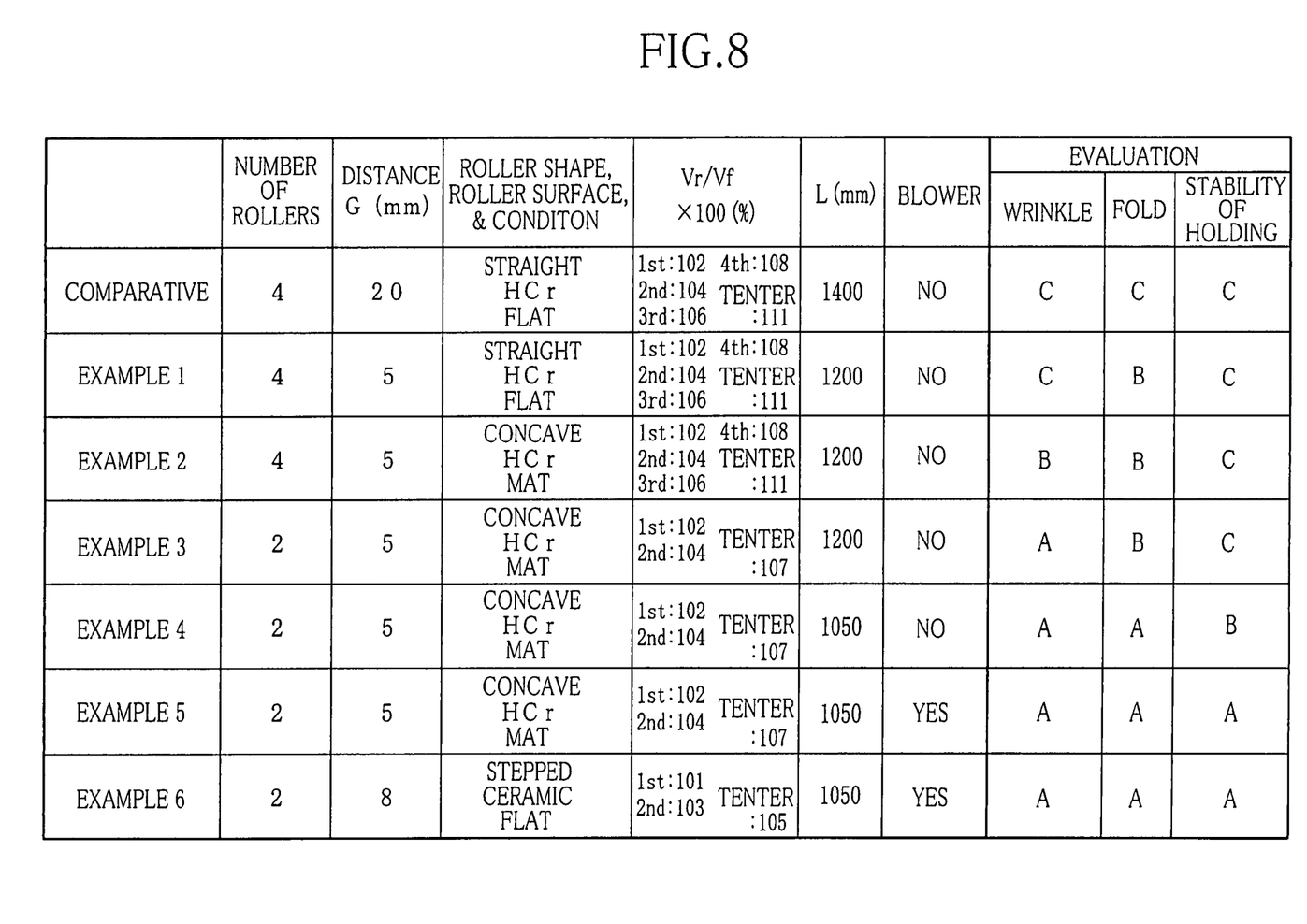
FIG. 8 is a table diagram showing evaluation results with respect to different conditions of the peeling and conveying process.

Table of FIG. 8 shows concrete differences in conditions between Comparative and Examples 1 to 6, and results of naked-eye evaluations with respect to the wrinkles on the produced film, the folds in the side edges of the film that can be caused by the curling of the film, and the stability of pinching of the film by the clips.

Examples and Comparative were graded into three levels on the respective view points: "A" stands for no problem, "B" for a case where some trouble occurred, and "C" for a case where troubles occurred so frequently that the line could not work.

It is to be noted that the width Wf of the cast web 17 was set to 1550 mm in all of these Examples and Comparative.

[Comparative]

In Comparative, the distance G from the metal band 15 to the first roller 22 was 20 mm, and the length L of the peeling and conveying process 20 was 1400 mm. The respective rollers were straight-type rollers having an equal diameter from end to end, and made of HCr having a flat surface each. The conveying speed Vr of each individual roller was defined as a relative value to the casting speed Vf or moving speed of the support 15. In Comparative, the conveying speed of the first roller was 102% of the speed Vf. Also, the conveying speeds of the second, third and fourth rollers were 104%, 106% and 108% of the speed Vf, respectively. The conveying speed through the tenter drying process was set at 111% of the speed Vf. The blowers were not installed in Comparative.

The film produced under these conditions got wrinkled so much that the evaluation on the wrinkles was "C". Since there were a lot of folds along the film lateral sides, the evaluation on the folds was "C". Also, the clips could not securely pinch the film, so the holding stability of the film by the clips was graded as "C".

Example 1

In Example 1, the distance G between the metal band and the first roller was 5 mm. The length L of the peeling and conveying process was 1200 mm. Other conditions were the same as Comparative.

The film produced under these conditions got wrinkled so much that the evaluation on the wrinkles was "C". Since there were folds along some parts of the film lateral sides, the evaluation on the folds was "B". Because the clips could not securely pinch the film, the holding stability of the film by the clips was graded as "C".

Example 2

In Example 2, the first to fourth rollers were concave rollers as described in the above embodiment. The surface of each of these concave rollers was finished to be mat. Other conditions were the same as Example 1.

The film produced under these conditions got wrinkled partially, so that the evaluation on the wrinkles was "B". Since some folds were observed along the film lateral sides, the evaluation on the folds was "B". Because the clips could not securely pinch the film, the holding stability of the film by the clips was graded as "C".

Example 3

Example 3 used just two rollers, i.e. the first and second rollers. The conveying speed through the tenter drying process was set at 107% of the casting speed Vf. Other conditions were the same as Example 2.

No wrinkle was observed in the film produced under these conditions, so that the evaluation on the wrinkles was "A". Since there were folds along some parts of the film lateral sides, the evaluation on the folds was "B". Because the clips could not securely pinch the film, the holding stability of the film by the clips was graded as "C".

Example 4

In Example 4, the length L of the peeling and conveying process was 1050 mm. Other conditions were the same as Example 3.

The film produced under these conditions did not have wrinkles, so that the evaluation in view of the wrinkles was "A". Since any folds were not observed along the film lateral sides, the evaluation on the folds was. "A". Because the clips could not securely pinch the film in some parts, the stability of holding of the film by the clips was graded as "B".

Example 5

In Example 5, the blowers as described in the embodiment were disposed at the entrance of the tenter drying section. Other conditions were the same as Example 4.

The film produced under these conditions did not get wrinkled, so that the evaluation in view of the wrinkles was "A". Since there was no fold along the film lateral sides, the evaluation on the folds was "A". Also because the clips could securely pinch the film, the stability of holding of the film by the clips was graded as "A".

Example 6

Example 6 used stepped rollers as the first and second rollers, instead of the concave rollers. The stepped roller had a diameter Z2 at its opposite end portions that was 2 mm greater than a diameter Z1 in its axially intermediate portion. The distance G between the metal band and the first roller was 8 mm. The conveying speed of the first roller was set at 101% of the casting speed Vf. The conveying speed of the second roller was set at 103% of the casting speed Vf, and the conveying speed through the tenter drying process was set at 105% of the casting speed Vf. Other conditions were the same as Example 5.

The film produced under these conditions did not get wrinkled, so that the evaluation in view of the wrinkles was "A". Since there was no fold along the film lateral sides, the evaluation on the folds was "A". Also because all of the clips could securely pinch the film, the stability of holding of the film by the clips was graded as "A".

[Total Evaluation]

With regard to Examples 1 to 6 and Comparative, it was proved that, where the distance G between the metal band and the first roller was 2 mm to 15 mm, and the length L of the peeling and conveying process was 10% to 80% of the film width, the curling of the film was reduced, so the film were prevented from being folded. Thereby, the productivity is improved.

It was proved that the wrinkles on the film were reduced by use of concave rollers or stepped rollers as the conveyer rollers in the peeling and conveying process. This leads to improving the productivity.

It was also proved that the stability of pinching the film by the clips was improved by disposing the blowers in the vicinity of the entrance of the tenter drying process. This also contributes to improving the productivity.

What is claimed is:

1. A solution film-forming method comprising:
   a casting process for forming a dope by dissolving a polymer with a solvent, and casting the dope onto a moving support to form a cast web;
   a peeling and conveying process for peeling said cast web off said support to convey said cast web by use of conveyer rollers which rotate while being in contact with said cast web on its opposite surface from said support; and
   a tenter drying process for drying said cast web while holding opposite lateral sides of said cast web by holding members, as said cast web is conveyed from said peeling and conveying process,
   wherein said peeling and conveying process has a length that is 10% to 80% of a width of said cast web, and
   wherein the method further comprises a process of blowing said cast web from above said cast web in laterally outward directions of said cast web to stretch curls in the lateral sides of said cast web, at the end of said peeling and conveying process or immediately before said tenter drying process.

2. A solution film-forming method as claimed in claim 1, wherein, in said blowing process, the air velocity is from 50 m/sec. to 150 m/sec., and the air temperature is from 20° C. to 60° C.

3. A solution film-forming method as claimed in claim 1, wherein said polymer is a cellulose ester, and said cast web has a thickness of 25 μm to 250 μm, a width of 1500 mm or more, and a moving speed of said support is not less than 45 m/min.

* * * * *